US012759160B2

(12) United States Patent
Loranger et al.

(10) Patent No.: US 12,759,160 B2
(45) Date of Patent: Oct. 13, 2026

(54) AUTOMATED SYSTEMS, DEVICES AND METHODS FOR PROCESSING FOODSTUFF CONSUMABLE PRODUCTS

(71) Applicant: Systemex Automation Inc., Laval (CA)

(72) Inventors: Mathieu Loranger, Laval (CA); Xavier St-Pierre, Laval (CA); Nuno Silva, Laval (CA); Imane Salhi, Laval (CA)

(73) Assignee: Systemex Automation Inc., Laval (CA)

( * ) Notice: Subject to any disclaimer, the term of this patent is extended or adjusted under 35 U.S.C. 154(b) by 275 days.

(21) Appl. No.: 18/432,496

(22) Filed: Feb. 5, 2024

(65) Prior Publication Data

US 2024/0261976 A1 Aug. 8, 2024

Related U.S. Application Data

(60) Provisional application No. 63/443,177, filed on Feb. 3, 2023.

(51) Int. Cl.

| | |
|---|---|
| ***B25J 9/16*** | (2006.01) |
| ***B25J 11/00*** | (2006.01) |
| ***B25J 18/02*** | (2006.01) |
| ***B25J 19/02*** | (2006.01) |

(52) U.S. Cl.

CPC ......... *B25J 9/1697* (2013.01); *B25J 11/0045* (2013.01); *B25J 18/025* (2013.01); *B25J 19/023* (2013.01)

(58) Field of Classification Search

USPC .................................................. 700/245–264

See application file for complete search history.

(56) References Cited

U.S. PATENT DOCUMENTS

| | | | | |
|---|---|---|---|---|
| 5,403,056 A * | 4/1995 | Wallace | ............. | A22C 17/0093 294/98.1 |
| 8,869,990 B2 * | 10/2014 | Skyum | ...................... | B07C 5/38 177/245 |
| 11,542,103 B1 * | 1/2023 | Paulson | ............... | B65G 47/905 |

(Continued)

FOREIGN PATENT DOCUMENTS

| | | | | |
|---|---|---|---|---|
| WO | WO-9111885 A1 * | 8/1991 | ........... | B07C 5/3422 |
| WO | WO-2017176717 A1 * | 10/2017 | ........... | G01N 33/025 |

*Primary Examiner* — Jonathan L Sample

(74) *Attorney, Agent, or Firm* — Fish & Richardson P.C.

(57) ABSTRACT

Automated system comprising a plurality of picking robots, a control entity including a data processor, and a perception system configured to acquire imaging information relating to foodstuff units being conveyed through a working area, the foodstuff units being on a plurality of trays. The control entity being in communication with the plurality of picking robots and the perception system, and is configured to a) determine absolute positional information and relative positional information relating to the foodstuff units using the imaging information, b) for each tray, using the relative positional information, determine a picking sequence for each picking robot, each picking sequence relating to a different subset of individual foodstuff units on the tray, and c) for each picking robot, using the absolute positional information, instruct the plurality of picking robots to pick a next individual foodstuff unit of the respective subset of individual foodstuff units in the determined picking sequence.

25 Claims, 11 Drawing Sheets

(56) References Cited

U.S. PATENT DOCUMENTS

| | | | | |
|---|---|---|---|---|
| 11,713,191 | B2 * | 8/2023 | Wan | B65G 1/0485 700/215 |
| 12,240,130 | B2 * | 3/2025 | Lizotte | B25J 19/022 |
| 2012/0165972 | A1 * | 6/2012 | Wappling | B25J 9/1687 700/213 |
| 2014/0195053 | A1 * | 7/2014 | Subotincic | B25J 19/023 294/213 |
| 2017/0290345 | A1 * | 10/2017 | Garden | A21C 9/08 |
| 2018/0050451 | A1 * | 2/2018 | Takanishi | B25J 9/1697 |
| 2018/0374144 | A1 * | 12/2018 | Smilowitz | B25J 9/0093 |
| 2020/0077670 | A1 * | 3/2020 | Hjálmarsson | A22C 25/18 |
| 2020/0139554 | A1 * | 5/2020 | Sinnet | B25J 19/02 |
| 2020/0167722 | A1 * | 5/2020 | Goldberg | G06Q 10/0832 |
| 2020/0397194 | A1 * | 12/2020 | Goldberg | G06T 19/006 |
| 2021/0032032 | A1 * | 2/2021 | Kalouche | B25J 5/007 |
| 2021/0237975 | A1 * | 8/2021 | Lert, Jr. | B65G 1/1373 |
| 2021/0371136 | A1 * | 12/2021 | Koike | B65B 25/00 |
| 2022/0289416 | A1 * | 9/2022 | Finnsson | B65B 43/46 |
| 2023/0001569 | A1 * | 1/2023 | Gandhi | B25J 9/0093 |
| 2023/0039524 | A1 * | 2/2023 | Bhageria | B25J 9/0093 |
| 2023/0083652 | A1 * | 3/2023 | Bhageria | B25J 9/1697 |
| 2024/0058971 | A1 * | 2/2024 | Guo | B25J 15/083 |

* cited by examiner

| Units per Tray | Picking sequence | | Product parameter |
|---|---|---|---|
| | Portion A | Portion B | |
| 6 | Bottom, top, center | Bottom, top, center | 9 inches, substantially circular shape |
| 12 | Bottom: center, left, right<br>Top: center, left, right | Top: center, left, right<br>Bottom: center, left, right | 6 inches, substantially circular shape |

Figure 4

AUTOMATED SYSTEMS, DEVICES AND METHODS FOR PROCESSING FOODSTUFF CONSUMABLE PRODUCTS

CROSS-REFERENCE TO RELATED APPLICATION

The present application claims the benefit of U.S. provisional patent application Ser. No. 63/443,177 filed on Feb. 3, 2023. The contents of the above-referenced document are incorporated herein by reference in their entirety.

TECHNICAL FIELD

The present disclosure relates to automation equipment systems, devices and methods.

More specifically, the present disclosure relates to an automated system, devices and method for industrial processing of foodstuff consumable products.

BACKGROUND

Increasingly, industries of all types are using robotic techniques for reasons of efficiency, precision, sanitation, and productivity. In the food industry, and particularly in the field of processed foodstuff consumable products, such as for example pastries, soft rolls, soft cakes, meat products, and the like, robotics are of use in moving foodstuff consumable products from one part of a production stream to another and ultimately into suitable packaging.

Industrial implementation of such robotic techniques, however, still face logistics challenges that may often represent an impediment to large-scale deployment thereof or for interfacing with existing equipment at manufacturing facilities. For example, implementing such robotic techniques for variable foodstuff units and formats on the same line can cause technical problems, since such techniques often rely on consistency of foodstuff specifications. For example, when manufacturing an extensive range of bakery products to meet consumer demands for convenience, single portions, family pack sizes etc., could mean a greater number of SKUs to accommodate, with product lines having multiple product changeovers in a shift, each involving different products types, packaging materials and packing methods. Wet areas can also be a problem as in some cases, equipment may need to withstand harsh wash-down procedures required to ensure full sanitization of robotic cell area.

Accordingly, there remains a need to provide solutions for automated system, devices and method for industrial processing of foodstuff consumable products.

SUMMARY

This Summary is provided to introduce a selection of concepts in a simplified form that are further described below in the Detailed Description. This Summary is not intended to identify key aspects or essential aspects of the claimed subject matter.

In a broad aspect, the disclosure relates to an automated system, comprising: a control entity including a data processor for receiving a production order via data communication, the production order identifying a foodstuff to process, a feed module containing a racking system, the racking system including a plurality of trays disposed on racks of the racking system, each tray of the plurality of trays including a plurality of foodstuff units disposed on a surface thereof, and a sorting cell configured to receive the plurality of trays from the feed module, the sorting cell including a robot system in communication with the control entity via data communication, the robot system including a plurality of robotic arms, wherein in response to control entity instructions including a picking sequence received by the robot system: a first portion of the plurality of robotic arms is configured to sequentially retrieve and place the plurality of trays from the racking system on a first conveyor to form a first production stream having a serial configuration, and a second portion of the plurality of robotic arms is configured to sequentially pick a foodstuff unit from a relevant tray according to the picking sequence, and place the picked foodstuff unit on a second conveyor to form a second production stream having a serial configuration.

In a broad aspect, the disclosure relates to an automated system, comprising a robot system including a plurality of picking robots configured to sort a plurality of foodstuff units being conveyed through a working area on a first conveyor, the plurality of foodstuff units being on a plurality of trays, a perception system, wherein the perception system is configured to acquire imaging information relating to at least the plurality of foodstuff units being conveyed through the working area, and a control entity including a data processor, the control entity being in communication with the robot system and the perception system via data communication, wherein the control entity is configured to determine a picking sequence based on perception data relating to the acquired imaging information received from the perception system and to release instructions including the picking sequence to the robot system, wherein in response to the instructions being received at the robot system, the plurality of picking robots is configured to sequentially pick a foodstuff unit from a relevant tray according to the picking sequence, and place the picked foodstuff unit on a second conveyor to form a production stream having a serial configuration.

In one broad aspect, the disclosure relates to a method comprising: acquiring imaging information relating to a plurality of foodstuff units being conveyed through a working area on a plurality of trays; determining absolute positional information and relative positional information relating to the foodstuff units using the imaging information; for each tray, using the relative positional information to determine a picking sequence for each of a plurality of picking robots, each picking sequence relating to a different subset of individual foodstuff units on the tray; and for each picking robot, using the absolute positional information to instruct the plurality of picking robots to pick a next individual foodstuff unit of the respective subset of individual foodstuff units in the determined picking sequence.

In one broad aspect, the disclosure relates to non-transitory computer-readable medium having instructions in code which when executed by a processor of a server acting as a control entity cause the server to: receive perception data from a perception system, the perception data relating to imaging information acquired from a detection area with the perception system, the detection area including at least a portion of a working area containing a plurality of foodstuff units being conveyed through the working area on a first conveyor, the plurality of foodstuff units being on a plurality of trays; determine a picking sequence based on the perception data, and release instructions including the picking sequence to a robot system, wherein the robot system includes a plurality of picking robots, wherein in response to the instructions received at the robot system, the plurality of picking robots is configured to sequentially pick a foodstuff unit from a relevant tray according to the picking sequence, and place the picked foodstuff unit on a second conveyor to form a production stream having a serial configuration.

In one broad aspect, the disclosure relates to a method, comprising: a) acquiring imaging information relating to a plurality of foodstuff units being conveyed through a working area on a plurality of trays; b) determining absolute positional information and relative positional information relating to the foodstuff units using the imaging information; c) for each tray, using the relative positional information to determine a picking sequence for each of a plurality of picking robots, each picking sequence relating to a different subset of individual foodstuff units on the tray; and d) for each picking robot, using the absolute positional information to instruct the plurality of picking robots to pick a next individual foodstuff unit of the respective subset of individual foodstuff units in the determined picking sequence.

In some embodiments, the method may include one or more of the following features:

- the relative positional information relates to whether individual foodstuff units partially overlap other individual foodstuff units.
- the absolute positional information relates to individual foodstuff unit positions in 2-dimensional space.
- the absolute positional information relates to individual foodstuff unit positions in 3-dimensional space.
- the imaging information is acquired using a machine vision camera.
- the absolute positional information and relative positional information are determined using computer vision and/or artificial intelligence.
- steps a) to d) are performed for each picking robot and each tray after each individual foodstuff unit is picked from the tray.

All features of exemplary embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

A detailed description of specific exemplary embodiments is provided herein below with reference to the accompanying drawings in which:

FIG. 4 is a non-limiting illustration of a database of picking sequences associated with different foodstuff parameters in accordance with some embodiments of the present disclosure.

Figure 1:
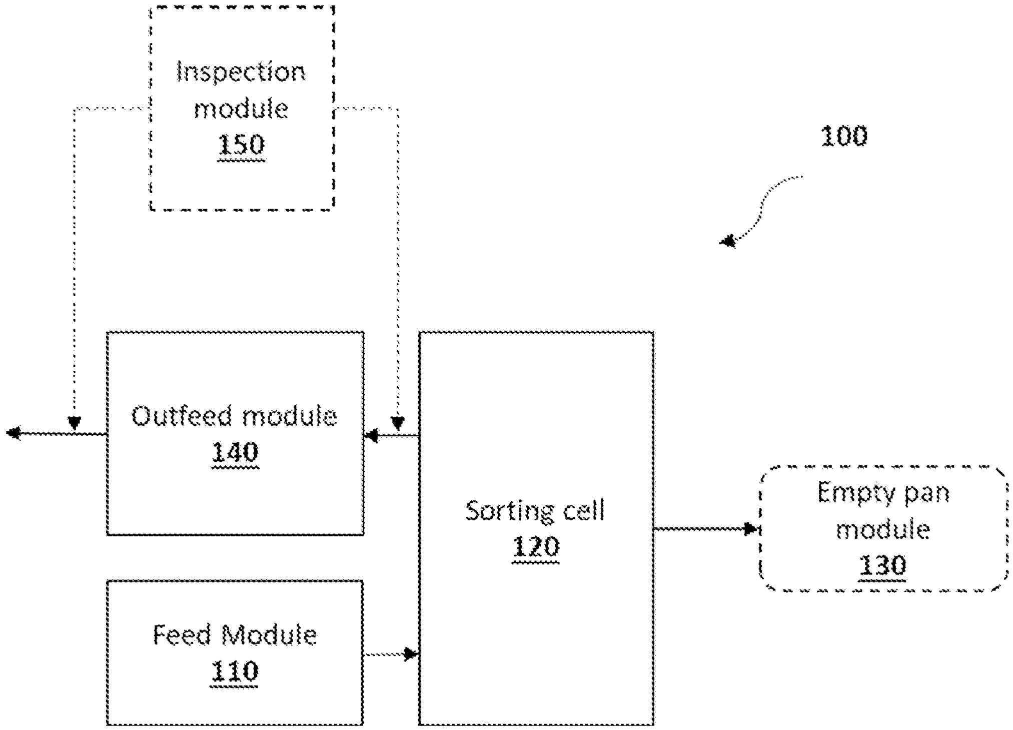
FIG. 1 is a non-limiting illustration that shows an automated system in accordance with some embodiments of the present disclosure.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art considering the instant disclosure, which variations and additions do not depart from the present technology. Hence, the following description is intended to illustrate some embodiments of the technology, and not to exhaustively specify all permutations, combinations, and variations thereof.

The present inventors have developed an automated system, devices, and method for processing foodstuff units. For example, for processing foodstuff, such as pies, cakes, pastries, and the like. Advantageously, the system, devices, and method described herein can be implemented in an industrial setting with minimal, or in some cases substantially without, human involvement.

The automated system, devices, and method described herein afford one or more technical advantages as will be apparent to a person skilled in the art in view of the present disclosure.

In some embodiments, the automated system, devices and method described herein may be tailored to various plant configurations, independently of the foodstuff being processed therein.

Automated System

Various components and devices of an automated system in accordance with the present disclosure will now be described in further details.

FIG. 1 is a non-limiting illustration of an automated system 100 including one or more module(s), which can be based on logistic or local requirements, and/or specific applications. For example, the automated system 100 may include a sorting cell 120, which is configured for sorting foodstuff units.

In some embodiments, the system 100 may further include one or more module(s) based on logistic or local requirements, and/or specific applications. For example, the system 100 may further include one or more of a feed module 110, an outfeed module 140, and an empty tray module 130. For example, the system 100 may further include an optional inspection module 150, which may be located downstream or upstream the outfeed module 140, for example.

As will be apparent to the reader in view of the present specification, each of the aforementioned modules may include one or more devices for performing the herein described operations.

Figure 2:
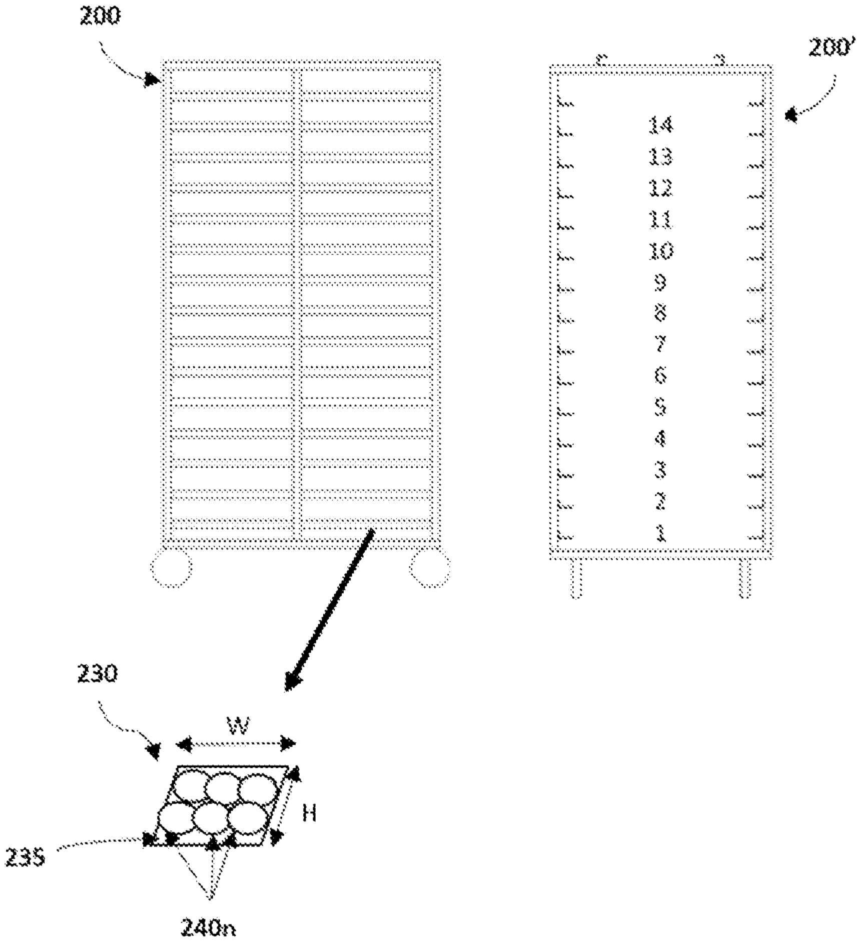
FIG. 2 is a non-limiting illustration that shows a racking system for holding a plurality of trays in accordance with some embodiments of the present disclosure.

Feed module 110 is configured to contain at least one racking system 200 or 200' as shown in FIG. 2. For example, the racking system 200 or 200' may be configured to receive a plurality of trays 230, each containing a plurality of foodstuff units 240$_n$ disposed thereon.

In some embodiments, each tray of the plurality of trays 230 may include a predetermined number of foodstuff units 240$_n$ disposed thereon. For example, the pre-determined number of foodstuff units 240$_n$ disposed on a surface of each tray 230 may be at least determined on criteria such as maximizing tray surface utilization and/or avoiding or minimizing contact between the foodstuff units 240$_n$. For example, in the case of a tray 230 having a substantially rectangular surface 235 for disposing foodstuff units 240$_n$ thereon, having a height H of about 18 inches (454 mm) and a width W of about 26 inches (656 mm), the pre-determined number of foodstuff units 240$_n$ disposed thereon could be for example 12 foodstuff units 240$_n$ having a substantially circular shape with a diameter of about 6 inches (about 153 mm), or 6 foodstuff units 240$_n$ having a substantially circular shape with a diameter of about 8 inches (about 203 mm) or about 9 inches (229 mm), and the like.

Each row or rack of the racking system 200 or 200' may include several trays 230. The number of trays 230 that can be placed along the depth direction on a given rack may be determined according to actual needs. For example, two trays 230 or three trays 230 or more can be placed. The number of trays 230 placed along the depth direction on a given rack is not limited in the present application. In some embodiments, the racking system can have wheels or rollers to displace the racking system as shown for racking system 200 or can be displaced by other means, such as with mechanical rails interacting with studs at the base on the racking system as shown for racking system 200'.

Sorting cell 120 is configured to receive a plurality of trays 230, each tray in the plurality of trays 230 containing a plurality of foodstuff units 240$_n$ disposed on a respective surface 235 thereof. For example, the plurality of trays 230 may be fed from the feed module 110 to the sorting cell 120. For example, the plurality of trays 230 may be fed to the sorting cell 120 one at a time. For example, the plurality of trays 230 may be disposed on a surface 124 of the sorting cell 120 in a serial configuration to form a first production stream.

In some embodiments, the surface 124 is of a first conveyor of the sorting cell 120, where the first conveyor is configured to displace the plurality of trays 230 forming the first production stream in a direction away from the feed module 110.

In some embodiments, the sorting cell 120 is further configured to pick and displace foodstuff units 240$_n$ from a first location to a second location. For example, the second location may be a second surface 126 of the sorting cell 120. For example, the foodstuff units 240$_n$ can be displaced from a respective surface 235 of a relevant tray to the second surface 126 of the sorting cell 120. The foodstuff units 240$_n$ may be disposed on the second surface 126 according to a serial configuration to form the second production stream. Preferably, the sorting cell 120 is configured to pick and displace foodstuff units 240$_n$, one unit at a time.

In some embodiments, the surface 126 is of a second conveyor of the sorting cell 120, where the second conveyor is configured to displace the foodstuff units 240$_n$ towards the outfeed module 150.

In some embodiments, the first and second conveyor can be configured to have opposite conveying directions, as shown with arrows 510, 510'. The reader will understand that other configuration are possible, depending on specific applications.

Figure 5:
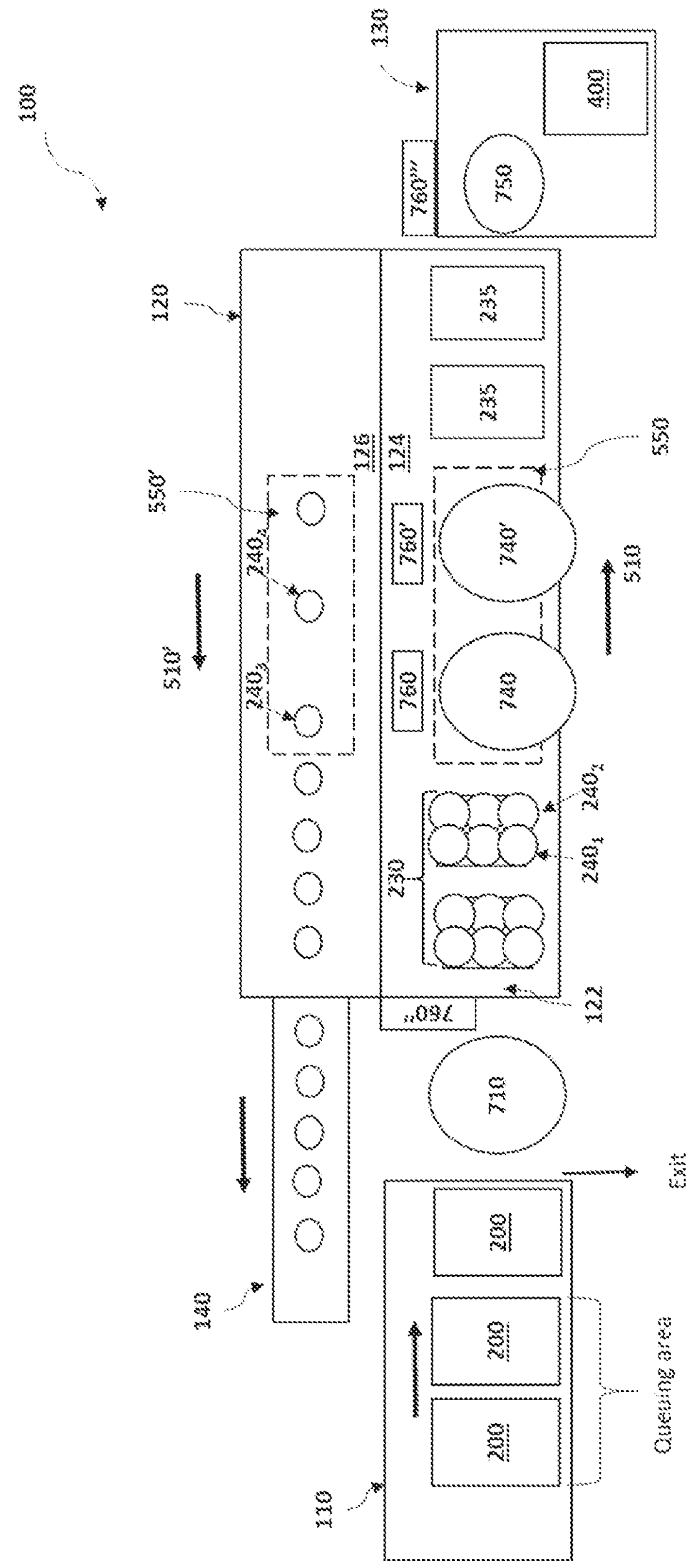
FIG. 5 is a non-limiting detailed illustration of the system of FIG. 1 in accordance with some embodiments of the present disclosure.

Empty tray module 130 is configured to receive empty trays 230 from the sorting cell 120. For example, empty trays 230 may be fed to the empty tray module 130 one at a time, following the serial disposition configuration forming the first production stream. The empty tray module 130 can be configured to retrieve empty trays 230 and convey same to a discard unit 400, as shown in FIG. 5.

Outfeed module 140 is configured to receive a plurality of foodstuff units 240$_n$ disposed according to the serial configuration forming the second production stream. The outfeed module 140 may be configured to further process the foodstuff units 240$_n$ in a downstream application. An example of downstream application includes packaging the foodstuff units 240$_n$ into a commercial packaging, where the packaging action may be automated, semi-automated, or manual.

Optional inspection module 150, which may be located downstream or upstream the outfeed module 140, may be configured to receive the plurality of foodstuff units 240$_n$ which are in the serial disposition configuration forming the second production stream. The inspection module 150 may be configured to inspect each of the plurality of foodstuff units 240$_n$ forming the second production stream to detect and assess defects warranting human intervention and/or rejection. For example, such inspection may be performed with any suitable detection means, such as with an image camera.

In some embodiments, the system 100 can be equipped with a robot system 700, a perception system, and a control entity 1000.

Robot System

In some embodiments, the robot system 700 is in communication with control entity 1000 via data communication, for example via a communication link. For example, the communication link can be a wireless or wired communication link.

In some embodiments, the robot system 700 includes a plurality of robotic arms to perform the herein described automated actions. In response to control entity instructions received by the robot system 700, the robot system 700 is configured to perform with the plurality of robotic arms one or more respective automated action(s).

In some embodiments, an automated action performed by the robot system 700 may include sequentially retrieve and place a plurality of trays 230 from one location to another location of the system 100. For example, from the racking system 200 or 200' to an entry point surface of the sorting cell 120. For example, placing the plurality of trays 230 in a serial configuration on a first conveyor to form a first production stream.

In some embodiments, the automated action performed by the robot system 700 may further include sequentially pick and place foodstuff units 240$_n$ from one location to another location of the system 100. For example, from a surface of a relevant tray of the plurality of trays 230 to a second conveyor. For example, placing the picked foodstuff units $240_n$ in a serial configuration on the second conveyor to form a second production stream.

In some embodiments, the first production stream and the second production stream are in opposite and parallel movement direction relationship. For example, the first production stream can be conveyed on a first conveyor in an opposite direction to the second production stream being conveyed on the second conveyor, where the first and second conveyors are disposed in parallel one to another.

Further possible automated actions performed by the robot system 700 will be apparent to the person of skill in view of the present text.

Practical non-limiting implementations of robot system 700 will now be discussed with respect to the accompanying drawings. The reader will nevertheless understand that variations thereof performing substantially similar functions in substantially the same manner are intended to be covered by the present disclosure.

Feed Robot

Figure 3:
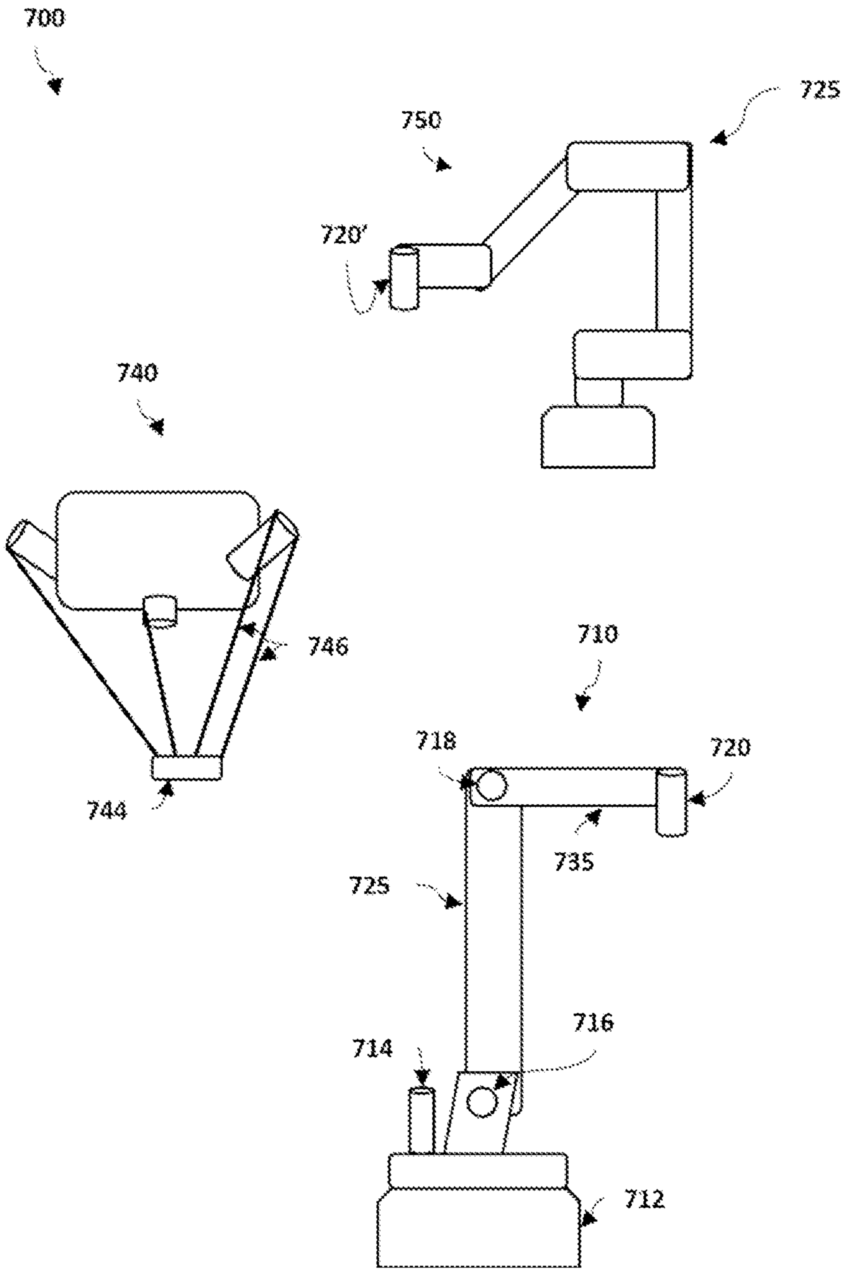
FIG. 3 is a non-limiting illustration that shows an robot system in accordance with some embodiments of the present disclosure.

In some embodiments, the robot system 700 includes feed robot 710 as shown in FIG. 3, which can be conveniently located in the feed module 110. The feed robot 710 can be in communication with the control entity 1000 via data communication, for example via a communication link. In operation, the control entity 1000 can communicate instructions to the feed robot 710 in the form of computer signals.

In some embodiments, the feed robot 710 may be equipped with one or more robotic arms configured to pick and displace a tray 230 from the racking system 200 or 200'.

For example, the one or more robotic arms can have an end of arm tool (EOAT) designed to manipulate trays 230 having pre-determined sizes and shapes. In most embodiments, the feed robot 710 is configured to pick (grip) a single tray 230 at a time although, in other embodiments, the feed robot 710 may be configured to pick (grip) more than one tray 230 at a time. For example, the feed robot 710 may include handling tool 720 on a distal portion of the telescopic arm 735 configured to grab the tray 230 and displacing same from one location to another. For example, the handling tool 720 may include arms for insertion underneath a tray 230 located on a rack of the racking system 200 or 200', where the arms are configured for contacting an underside of the tray 230 and stabilizing and/or securing the tray 230 while the feed robot 710 lifts the tray 230 and displaces same towards the sorting cell 120.

For example, the one or more robotic arms may include telescopic arms 725, 735 configured to allow multiple axis movements. For example, the telescopic arms 725, 735 may include one or more pivot joints 714, 716, 718 allowing the multiple axis movements. For example, the feed robot 710 can be a multiple-axis industrial robot, such as a 6-axis industrial robot.

For example, a suitable multiple-axis industrial robot can be the Fanuc Robot M20iD-35 (FANUC America Corporation, Rochester Hills, USA).

In response to the control entity 1000 instructions received by the robot system 700, the feed robot 710 is configured to perform an automated action, such as to sequentially retrieve and place a plurality of trays 230 from one location to another location of the system 100. For example, from the racking system 200 or 200' to an entry point surface of the sorting cell 120. For example, the entry point surface of sorting cell 120 can be entry point surface 122 of surface 124 as shown in FIG. 5.

In some embodiments, the feed robot 710 may be configured to retrieve one tray 230 at a time from the racking system 200 or 200'. In other embodiments, the feed robot 710 may be configured to retrieve two or more trays 230 at a time, depending on specific applications.

Advantageously, the feed robot 710 can be equipped with a vacuum switch and can detect sequence failures. For example, if a tray 230 is not grabbed at the beginning of the sequence, or if the tray 230 is dropped between the retrieve and displace sequence. Failure detection can lead to cause the release of an alarm and/or notification intended for a human operator. The alarm can be an audio and/or visual signal, an electronic notification, and the like.

Picking Robot

In some embodiments, the robot system 700 includes a plurality of picking robots 740, which can be conveniently located in the sorting cell 120. An example of a picking robot 740 is shown in FIG. 3. The plurality of picking robots 740 can be in communication with the control entity 1000 via data communication, for example via the communication link. In operation, the control entity 1000 can communicate instructions to the plurality of picking robots 740 in the form of computer signals.

In some embodiments, the plurality of picking robots 740 is disposed along a direction of the first conveyor in an upstream/downstream relationship one to the other. For example, two picking robots 740, 740' can be disposed side-by-side, as shown in FIG. 5. The plurality of picking robots 740 can be substantially identical robots.

In some embodiments, the plurality of picking robots 740 is advantageously disposed in an elevated relationship relative to a top surface 124 of the first conveyor.

In some embodiments, each of the plurality of picking robots 740 may be equipped with one or more robotic arms 746 configured to pick and displace foodstuff units $240_n$ from a relevant tray of the plurality of trays 230 to another location of the system 100. In most embodiments, the plurality of picking robots 740 is configured to sequentially pick and displace foodstuff units $240_n$, one unit at a time. For example, the one or more robotic arms 746 may include a manipulator 744 designed to pick a foodstuff unit $240_n$, where the manipulator is disposed on a distal portion of robotic arms 746. Preferably, the one or more robotic arms 746 are telescopic arms. In most embodiments, the manipulator 744 is designed to pick the foodstuff units $240_n$, one unit at a time.

A non-limiting example of commercially available picking robot includes but is not limited to the FlexPicker IRB 360 (ABB Inc. Robotics & Discrete Automation, Auburn Hills, USA).

In some embodiments, the manipulator 744 may include a holder and resilient gripping members coupled to the holder. Advantageously, such gripping members can be elastically deformable between a gripping position and a release position in order to grip or to release foodstuff units $240_n$, respectively. The manipulator 744 may include an actuator movable relative to the holder for effecting said deformation. For example, the gripping members can be bendable between a gripping position and a release position.

In response to the control entity 1000 instructions received by the plurality of picking robots 740, the plurality of picking robots 740 is configured to perform an automated action, such as to pick and displace foodstuff units $240_n$ as discussed previously. For example, to sequentially pick and displace foodstuff units $240_n$ from one location to another location of the system 100. For example, from a surface of a relevant tray of the plurality of trays 230 to a second conveyor. For example, placing the picked foodstuff units $240_n$ on the second conveyor to form a second production stream having a serial configuration. For example, from the first production stream to the second production stream. For example, to pick and displace foodstuff units 240$_n$ from surface 235 of a relevant tray 230 to a second surface of the sorting cell 120.

In a practical implementation, with reference to FIG. 5, the automated action may include sequentially picking and displacing foodstuff units 240$_n$ from surface 235 of a relevant tray 230 onto surface 126 of the second conveyor, to the second production stream having the serial configuration. The automated action can be performed while the relevant tray 230 is conveyed on the surface 124 of the first conveyor, and while the second conveyor conveys the displaced foodstuff units 240$_n$. For example, the displaced foodstuff units 240$_n$ can be conveyed towards the outfeed module 140.

In some embodiments, the plurality of picking robots 740 may be configured to pick foodstuff units 240$_n$ with a descending vertical movement of the manipulator 744 via the telescopic arms 746. The plurality of picking robots 740 is further configured to then grip a foodstuff unit 240$_n$ with the manipulator 744 and elevate the foodstuff unit 240$_n$ with an ascending vertical movement of the manipulator 744 via the telescopic arms 746. The plurality of picking robots 740 is further configured to then displace the foodstuff unit 240$_n$ with a lateral movement of the manipulator 744 via the telescopic arms 746 into an elevated position relative to the surface 126 of the second conveyor. The plurality of picking robots 740 is then configured to place the foodstuff unit 240$_n$ onto the surface 126 of the second conveyor with a descending vertical movement of the manipulator 744 via the telescopic arms 746, and release the foodstuff unit 240$_n$ from the manipulator 744.

In some embodiments, the manipulator 744 may be configured to pick vulnerable foodstuff units relatively quickly and safely, without deforming and/or breaking the foodstuff units. The reader will readily appreciate that the manipulator 744 can also be used to grip non-vulnerable products, or medium-sensitive products.

Alternatively or additionally, the manipulator 744 may include a vacuum device or suction device to exert an upward suction force on the topside of the foodstuff units 240$_n$ to restrain the foodstuff units 240$_n$ on the manipulator 744. Advantageously, the plurality of picking robots 740 can be equipped with a vacuum switch and can detect sequence failures (i.e., an error event). For example, if a foodstuff unit 240$_n$ is not grabbed at the beginning of the sequence, or if the foodstuff unit 240$_n$ is dropped between the pick and displace sequence. Alternatively or additionally the error event can be detected with the perception system, which is discussed elsewhere in this text.

For example, failure detection (i.e., error event) can lead to causing the release of an alarm and/or notification intended for a human operator. The alarm can be an audio and/or visual signal, an electronic notification, and the like.

As discussed elsewhere in this text, failure detection (i.e., error event) can additionally or alternatively lead to the control system 1000 to halt at least a portion of the system 100, for example one or more of the following: stopping the first conveyor, stopping the automated actions of the feed robot 710, stopping the automated actions of the plurality of picking robots 740, and the like.

Discarding Robot

In some embodiments, the robot system 700 includes discarding robot 750 as shown in FIG. 3, which can be conveniently located in the empty tray module 130 downstream from the sorting cell 120. The discarding robot 750 can be in communication with the control entity 1000 via data communication, for example via the communication link. In operation, the control entity 1000 can communicate instructions to the discarding robot 750 in the form of computer signals.

In some embodiments, the discarding robot 750 may be equipped with an articulated arm configured to pick and displace an empty tray 230 from one location to another.

In some embodiments, the discarding robot 750 may be equipped with an articulated arm 725 capable of multiple axis movements. In some embodiments, the discarding robot 750 is a multiple-axis industrial robot, such as a 6-axis robot.

In some embodiments, the discarding robot 750 may further include a handling tool 720' on a distal portion of the articulated arm 725 configured for grabbing the empty tray 230 and displacing same from one location to another.

In some embodiments, the handling tool 720' may include one or more vacuum suction cups configured for contacting the empty tray 230 and securing the empty tray 230 to the handling tool 720' while the discarding robot 750 displaces the empty tray 230.

For example, the discarding robot 750 may be configured to pick and displace empty trays 230 from which all foodstuff units 240$_n$ have been removed, from the sorting cell 120 to the empty tray module 130. For instance, displacing the empty tray 230 to a discarding unit 400 located in the empty tray module 130, as shown in FIG. 5.

A non-limiting example of commercially available robot suitable for performing such operations include but is not limited to the CRX-10iA Cobot (Fanuc Americas, Michigan, USA).

Advantageously, the discarding robot 750 can be equipped with a vacuum switch and can detect sequence failures. For example, if an empty tray 230 is not grabbed at the beginning of the sequence, or if the empty tray 230 is dropped between the pick and displace sequence. Failure detection can lead to causing the release of an alarm and/or notification intended for a human operator. The alarm can be an audio and/or visual signal, an electronic notification, and the like. Failure detection can cause the control entity 1000 to halt at least a portion of the system 100 as discussed elsewhere in this text.

Perception System

In some embodiments, the system 100 is equipped with a perception system including imaging devices that are directed toward a detection area for providing perception data regarding objects in the detection area. Preferably, the system 100 is equipped with a plurality of imaging devices, such as imaging devices 760, 760', 760".

In some embodiments, imaging devices 760, 760', 760" can be machine vision cameras configured to generate image information of a two-dimensional portion of the detection area, such as working area 550, dropping area 550', or entry point surface 122. A non-limiting example of a machine vision camera is a CA-H200CX camera system marketed by Keyence Corporation™. As will be appreciated by the skilled reader, other imaging devices may be suitable for implementing the systems and performing the methods disclosed herein.

In some embodiments, the detection area includes at least a portion of working area 550 in order to determine one or more physical characteristic of trays 230 and/or foodstuff units 240$_n$ traveling through working area 550. In some embodiments, imaging devices 760 and 760' are also configured to determine positional information relating to the absolute and/or relative locations of foodstuff units 240$_n$ traveling through working area 550. In some embodiment, the positional information determined by imaging devices 760 and 760' may be used by the automated system 100 to control first picking robot 740 and second picking robot 740', respectively, when picking foodstuff units $\mathbf{240}_n$ traveling through working area 550. In some embodiments, such positional information may be used by the automated system 100 to determined the picking sequence in which the foodstuff units $\mathbf{240}_n$ are to be picked by, for example, determining which of foodstuff units $\mathbf{240}_n$ overlap or partially overlap which other of foodstuff units $\mathbf{240}_n$.

In some embodiments, the detection area further includes at least a portion of dropping area 550' in order to determine availability of an intended dropping location on the second conveyor. For example, the intended dropping location for a given picking robot 740 can be within a movement path thereof. In some embodiments, the imaging devices 760 and 760' are also configured to capture and provide perception data regarding the presence or relative location of foodstuff units $\mathbf{240}_n$ in the relevant portion of dropping area 550', e.g., when the perception data conveys that the intended dropping location on the second conveyor already contains a foodstuff unit $\mathbf{240}_n$, then the relevant one of the plurality of picking robots 740 assigned to drop the picked foodstuff unit $\mathbf{240}_n$ at the intended dropping location is then instructed to wait until the perception system detects that the intended dropping location is available before placing the picked foodstuff unit $\mathbf{240}_n$ on the intended dropping location. Accordingly, the plurality of picking robots 740 is capable to place foodstuff units on the second conveyor without overlap between sequential foodstuff units $\mathbf{240}_{n\ldots n+1}$ to form the second production stream having a serial configuration.

In some embodiments, the detection area further includes entry point surface 122 of the sorting cell 120 in order to determine availability of a portion of surface 124 of the first conveyor. In some embodiments, imaging device 760" is configured to capture and provide perception data regarding the presence or absence of a tray 230 at the entry point surface 122. Obtaining information relating to whether the entry point surface 122 is occupied with a tray 230 or whether it is available, will allow the control system 1000 to assess and determine whether the sorting cell 120 can accommodate a retrieved tray 230, and therefore instruct the feed robot 710 accordingly.

As will also be appreciated by the skilled reader, while the perception system has been described with imaging devices, any other suitable combination of emitter and detector may be used.

In some embodiments, the perception system is configured to convey perception data (e.g., image information) to the control entity 1000 and/or to the plurality of picking robots 740 in the form of computer readable data over data communication, for example via the communication link.

For example, the computer readable data may include information capable of being analyzed by CPU 136 to determine measurable physical properties (e.g., dimensions, edges, and positions). For example, measurable physical properties (e.g., dimensions, edges, and positions) of foodstuff units $\mathbf{240}_n$ and/or relevant trays 230 being conveyed through working area 550, a tray 230 location, orientation or state (e.g., information relating to whether a tray 230 located downstream from a given picking robot 740 is empty or still inadvertently includes one or more units of the foodstuff unit $\mathbf{240}_n$, and the like); the location of a relevant foodstuff unit $\mathbf{240}_n$, orientation or state (e.g., information such as "at least one pickable foodstuff unit", "foodstuff unit detected, but path blocked by unrecognized object", "no foodstuff unit recognized", "empty", etc.); the entry point surface 122 of surface 124 state (i.e., information relating to freedom to dispose thereon a subsequent tray 230 or not, and the like); position and number of single units of foodstuff units $\mathbf{240}_n$ onto the surface 235 of a given tray 230; surface 126 of the second conveyor state (i.e., information relating to an intended location availability to receive a foodstuff unit $\mathbf{240}_n$ that is being displaced); and the like.

Upon processing such computer readable data, the control entity 1000 may cause the release of an alarm notification in presence of an error condition. The alarm notification may be in any suitable form including, without being limited to, an e-mail message; a pop-up message caused to be displayed on a computer device; an audio alarm that is caused to be released by a speaker (for example a speaker in the vicinity of automated system 100; and/or a visual alarm (such as an emergency light in the vicinity of the automated system 100. It will be appreciated that the notification message may be embodied in many other different suitable manners that will become apparent to the person skilled in the art in light of the present document. Alternatively or additionally, the control entity 1000 may cause halting of at least a portion of the system 100, as discussed elsewhere in this text.

Queuing Area

In some embodiments, the feed module 110 may include a queuing area 580, which can be conveniently located at or near the entry point 122 of the sorting cell 120. The queuing area 580 may include a plurality of racking systems 200 or 200'. In some embodiments, the queuing area may be enclosed within a space defined by walls with or without a roof, for example.

In some embodiments, the queuing area 580 may require human intervention to bring a filled up racking system 200 or 200' therein and/or to exit an empty racking system 200 or 200' therefrom.

In some embodiments, the automated system 100 may include automated displacement means for moving the filled up racking system 200 or 200' within the queuing area 580 towards the sorting cell 120. In some embodiments, the automated system 100 may include automated displacement means for moving the empty racking system 200 or 200' out from the queuing area 580. For example, automated displacement means may be controlled by the control entity 1000.

In some embodiments, automated displacement means may include one or more sensors to detect the position of racking system 200 or 200' units on the displacement means, and eventually communicate with the control entity 1000 to convey positional data indicative that a racking system 200 or 200' is in place in the feed module 110.

Control Entity

Figure 6:
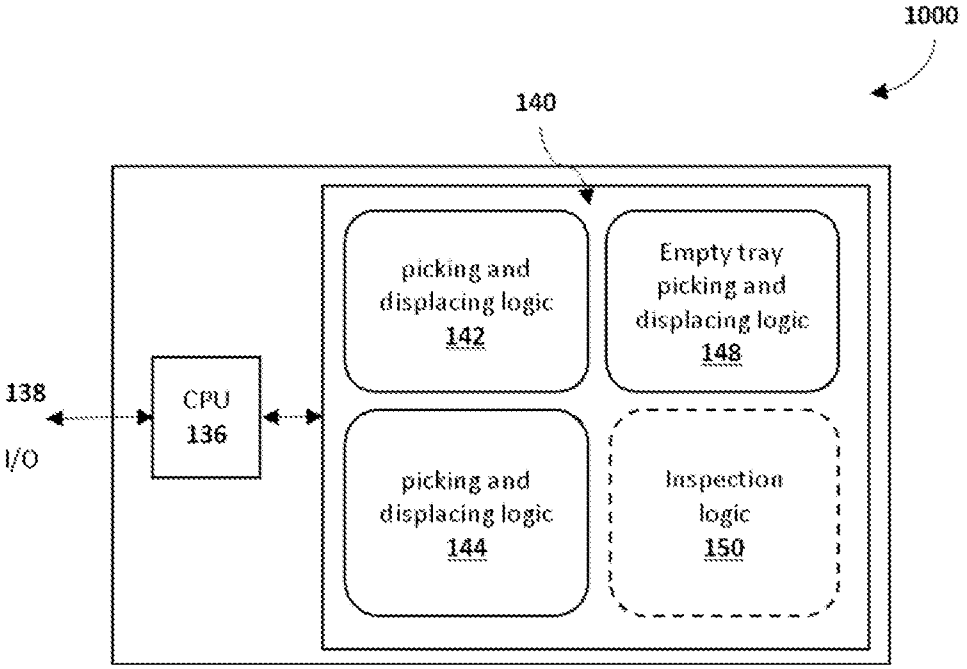
FIG. 6 is a non-limiting illustration of functional blocks of a control entity in accordance with some embodiments of the present disclosure.

In a non-limiting implementation, and with further reference to FIG. 6, the control entity 1000 is computer-based, including a data processor and a machine-readable storage encoded with software for execution by the data processor. The software defines logic, which determines how the system described herein operates.

Specifically, the control entity 1000 has an input/output (I/O) interface 138, at least one data processor 136 and a machine-readable storage, or memory, 140. The readable storage, or memory, 140 is encoded with software for execution by the data processor 136. The data processor 136 can be coupled to the I/O interface 138 to allow the transfer of information to the external peripheral devices and/or to graphical user interface associated with the system 100.

While FIG. 6 illustrates the control entity 1000 as being contained within a single computer device, the reader will readily understand that a link of computers, for example a server arrangement, can implement the control entity 1000. For example, a module of the system 100 may have one or more dedicated server(s) located therein, which are connected through wireless or wired connections with the other servers located in the other modules, together forming the control entity 1000. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Referring back to the data storage 140, the software instructions provide a range of functions, which may include a tray picking and displacing logic block, or module 142, a foodstuff units picking and displacing logic, or module 144, an empty tray picking and displacing logic, or module 148, and, optionally, an inspection logic, or module 150.

Feeding Process

Figure 7A:
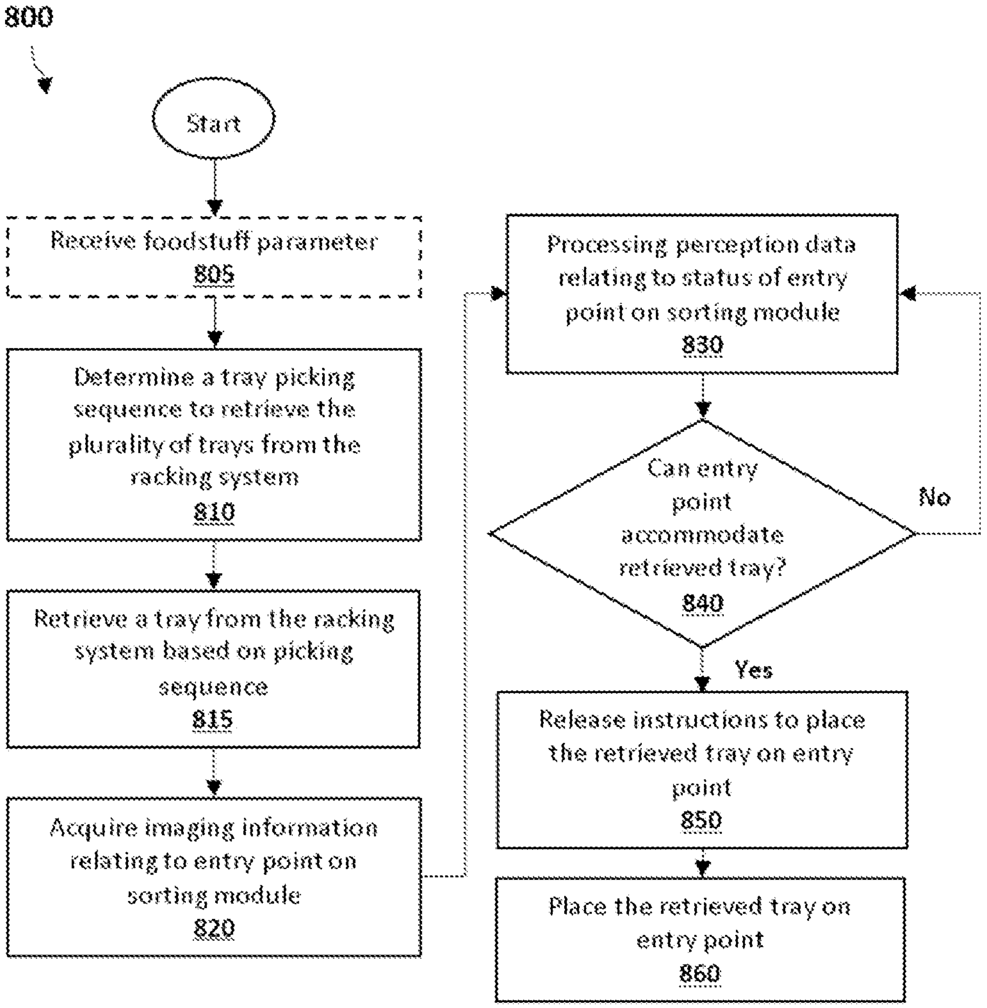
FIGS. 7A, 7B and 7C are non-limiting flowcharts illustrating method steps for processing foodstuff units in accordance with some embodiments of the present disclosure.

With reference to FIG. 7A, a non-limiting flow chart of an illustrative feeding process 800 is shown.

After the control entity 1000 is in an active state (generally represented by a "start" condition), the controller can receive via data communication a production order, the production order identifying foodstuff characteristic, such as type of foodstuff to process and/or a format parameter of the foodstuff to process, at optional step 805. For example, an illustrative example of format parameter may be "pie having circular shape of 9" diameter" or "pie having circular shape of 6" diameter", and the like, and an illustrative example of type of foodstuff to process may be "strawberry pie", or "apple pie", and the like. Information extracted from the production order can be used by the control entity 1000 when processing perception data in order to identify in the imaging information those objects that correspond to foodstuff units.

In some embodiments, the foodstuff characteristic can be an input from a human operator interfacing with an external peripheral devices and/or with a graphical user interface associated with the system 100. In other embodiments, the foodstuff characteristic can be encoded in computer read-writable tag associated with the racking system containing the plurality of trays 230. For example, the computer read-writable tag may be an RFID tag. The RFID tag may comprise a memory, an antenna and a microcontroller that allows reading and writing of the memory content. The RFID tag may be a passive RFID tag, to which power must be supplied when writing to the memory, and which can be read by energizing it wirelessly from a distance, such that it releases the contents of its memory. An active RFID tag may also be used, whereby the tag includes a built-in power supply that is replenished by a battery, kinetic movement, etc.

Other read-writable tag may also be suitable, such as barcodes or devices based on NEC or Zigbee technology, for example.

In some embodiments, the control entity 1000 implements a tray picking and displacing logic block, or module 142.

In some embodiments, the tray picking and displacing logic block, or module 142 computes and determines a tray picking sequence to retrieve the plurality of trays 230 from the racking system, at step 810. For example, the tray picking and displacing logic block, or module 142 can instruct the feed robot 710 to consecutively pick and displace a plurality of trays 230 from the racking system 200 or 200' according to the tray picking sequence. For example, the tray picking sequence may cause the feed robot 710 to consecutively pick and displace the plurality of trays 230 starting from the bottom rack towards the top rack of the racking system 200 or 200', as shown with numbers 1-14 in FIG. 2. Such picking sequence advantageously avoids possible contamination that could otherwise occur to foodstuff units disposed on a tray located in a lower rack when retrieving a tray located above. This picking sequence can be determined based on foodstuff parameter received, where a lookup table or database in the control entity may contain predetermined picking sequences to pick and displace the plurality of trays 230 from the racking system.

In some embodiments, the tray picking and displacing logic block, or module 142 releases the picking sequence instructions to the fed robot 710, which upon receiving the instructions including the picking sequence, the feed robot 710 then retrieves a tray 230 from the racking system accordingly, at step 815.

In parallel or sequentially, the logic of the control entity 1000 can process perception data obtained from the perception system, for example from imaging device 760''', to determine the status of the entry point 122 on the sorting cell at step 820. For example, the perception system may include one or more imaging device 760'' located in the vicinity of the entry point 122.

At step 830, the control entity 1000 processes the perception data relating to the entry point 122 to determine if it is available to receive the next tray 230. In case that the control entity 1000 determines at step 840 that the entry point 122 is not available to accommodate the retrieved tray 230 ("NO" in FIG. 7A), then the process returns to step 820. In case that the control entity 1000 determines at step 840 that the entry point 122 is available and can accommodate the retrieved tray 230 ("YES" in FIG. 7A), the tray picking and displacing logic block, or module 142 releases instructions to the feed robot 710 to place the retrieved tray 230 at the entry point 122, at step 850. Upon receiving the instructions, the feed robot 710 is configured to place the retrieved tray 230 at the entry point 122, at step 860.

The logic of the control entity 1000 then proceeds to repeat steps 815, 820, 830, 840, 850, 860 until all trays 230 corresponding to the production order have been retrieved and placed at the entry point 122. The reader will readily understand that when a racking system has been depleted of all trays 230 racked therein, then the depleted racking system proceeds to exit the feed module 110 and the next racking system in the queuing area is brought forward towards the feed robot 710 in order to fulfill a given production order.

Advantageously, the control entity 1000 can control the cadence of the feed robot 710 to synchronize the robot system 700. For example, ensuring that there is substantially the same or sufficient separation distance between subsequent trays 230 on the surface 124 forming the first production stream, which can be advantageous for downstream automated operations. For example, ensuring that the plurality of the tray 230 are fed at a pace that enables foodstuff units 240$_n$ to be picked and placed on the surface of the second conveyor within a time frame that enables emptying the tray 230 before reaching the empty tray module, while displacing the foodstuff units at a reasonable pace and without causing damages that could occur under faster operation pace.

Sorting Process

Figure 7B:
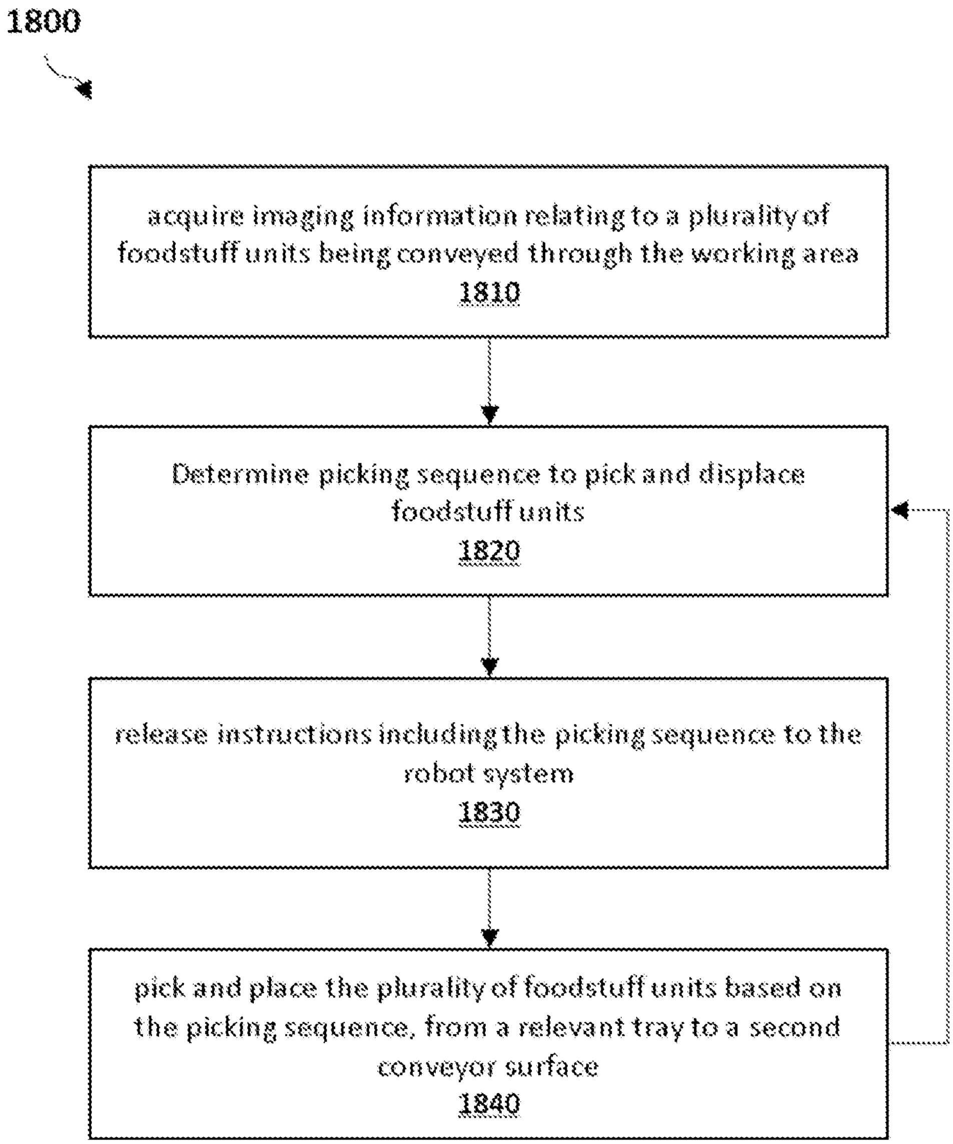

With reference to FIG. 7B, a non-limiting flow chart of an illustrative feeding process 1800 is shown.

In some embodiments, after a relevant tray is conveyed on the first conveyor through working area 550, where the relevant tray includes a plurality of foodstuff units 240$_n$, the perception system is configured to acquire imaging information relating to a plurality of foodstuff units 240$_n$ being conveyed through the working area 550, at step 1810.

In some embodiments, the control entity 1000 implements a foodstuff units picking and displacing logic, or module, 144. At step 1820, the foodstuff units picking and displacing logic, or module, 144 determines a picking sequence to pick and displace foodstuff units 240$_n$.

For example, the picking and displacing logic, or module, 144 can compute and determine an optimal picking sequence based on detection data relating to the acquired imaging information provided by the perception system, such as from imaging devices 760, 760'. Such optimal picking sequence can advantageously reduce collisions between foodstuff units, which could otherwise result in rejection-causing damages. Alternatively, the machine-readable storage, or memory, 140 includes predetermined picking sequence instructions associated with a foodstuff characteristic, for example in the format of a lookup table or database, which can be selected based on foodstuff parameter received at step 805.

The foodstuff units picking and displacing logic, or module, 144 then proceeds to step 1830 to release instructions including the picking sequence to the robot system 700. Such instructions instruct the plurality of picking robots 740, preferably to a selected one of the plurality of picking robots 740, to pick foodstuff units 240$_n$ from the surface 235 of the relevant tray 230 according to the picking sequence, and place the picked foodstuff units 240$_n$ on the second conveyor to form the production stream having a serial configuration.

For example, the perception data can contain information to determine a location of the foodstuff unit in the detection area. For example, the perception data can contain information to determine measurable physical properties of the foodstuff unit 240$_n$ being conveyed in the working area. For example, the measurable physical properties of the foodstuff unit can include at least one of dimension, edge, and position. For example, the perception data can contain information to determine availability of a dropping zone on the second conveyor.

In some embodiments, the machine-readable storage, or memory, 140 includes software instructions that when implemented by the CPU 136 instruct the plurality of picking robots 740 to implement the optimal or predetermined picking sequence. For example, and with reference to FIGS. 8A and 8B, when the robot system 700 includes two picking robots 740, 740' the optimal or predetermined sequence may direct first picking robot 740 to pick selected units on a first half portion A of the tray 230 surface, and second picking robot 740' to pick selected units on a second half portion B of the tray 230 surface. In other words, the optimal or predetermined sequence may assign specific portion area of the relevant tray 230 and/or specific foodstuff units.

Figure 8A:
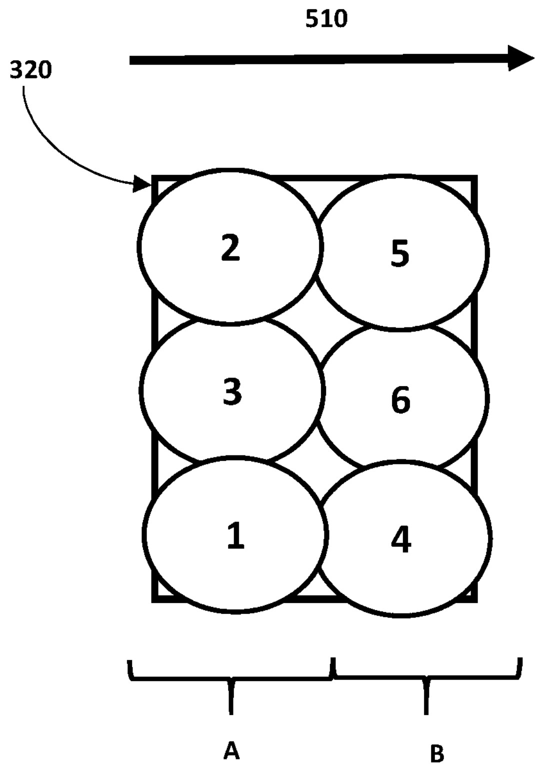
FIGS. 8A and 8B are non-limiting illustrations of 6 substantially circular shaped foodstuff units and 12 substantially circular shaped foodstuff units on respective trays, with the corresponding respective picking sequence, in accordance with some embodiments of the present disclosure.

In a non-limiting implementation, and with reference to FIG. 8A, a tray 230 being conveyed on the first conveyor along a conveying direction 510 may include a plurality of foodstuff units 240$_{1 \ldots 6}$, where three units are disposed on the first half portion A and three units are disposed on the second half portion B. In such case, the optimal or predetermined sequence may direct the upstream first picking robot 740 to pick selected units on the first half portion A, starting with the unit 1 disposed on the bottom left corner of the tray 230 surface, followed with the unit 2 disposed on the top left corner, and finally followed with the unit 3 disposed on the left center of tray 230 surface. The optimal or predetermined sequence may also direct the downstream second picking robot 740' to pick selected units on the second half portion B, starting with the unit 4 disposed on the bottom right corner of the tray 230 surface, followed with the unit 5 disposed on the top right corner, and finally followed with the unit 6 disposed on the right center of tray 230 surface.

Figure 8B:
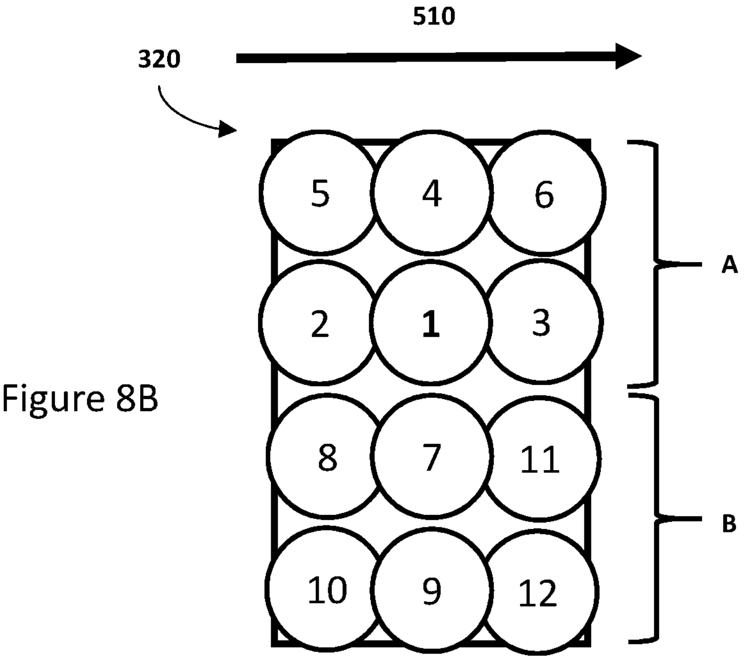

In a non-limiting implementation, and with reference to FIG. 8B, a tray 230 being conveyed on the first conveyor along a conveying direction 510 may include a plurality of foodstuff units 240$_{1 \ldots 12}$, where six units are disposed on the first half portion A and six units are disposed on the second half portion B. In such case, the optimal or predetermined sequence may direct the upstream first picking robot 740 to pick selected units on the first half portion A, starting with the unit 1 disposed on the bottom center of the portion A, followed with the unit 2 disposed on the bottom left corner of the portion A, followed with the unit 3 disposed on the bottom right corner of the portion A, followed with the unit 4 disposed on the top center of the portion A, followed with the unit 5 disposed on the top left corner of the portion A, and followed with the unit 6 disposed on the top right corner of the portion A. The optimal or predetermined sequence may also direct the downstream second picking robot 740' to pick selected units on the second half portion B, starting with the unit 7 disposed on the top center of the portion B, followed with the unit 8 disposed on the top left corner of the portion B, followed with the unit 9 disposed on the top right corner of the portion B, followed with the unit 10 disposed on the bottom center of the portion B, followed with the unit 11 disposed on the bottom left corner of the portion B, and followed with the unit 12 disposed on the bottom right corner of the portion B.

As will be appreciated by the skilled reader, the number of portions determined for each tray 230 can be proportional to the number of picking robots 740 used in working area 550. While the above non-limiting examples describe two portions and two picking robots 740, other embodiments including fewer or more portions and picking robots 740 are clearly within the scope of what is being described herein. Each portion of a relevant tray 230 contains a subset of the foodstuff units 240$_{1 \ldots 6}$ disposed on the tray 230.

As shown in FIGS. 8A and 8B, foodstuff units 240$_{1 \ldots 6}$ can be disposed on trays 230 in such a way as to overlap or partially overlap each other, which can be performed by a human operator before cooking the foodstuff unit. In particular, in FIGS. 8A and 8B, some foodstuff units 240$_{1 \ldots 6}$ partially overlap at their peripheral edges.

In some embodiments of the presently disclosed systems, methods and non-transitory computer-readable media, the optimal or predetermined sequence is determined so as to ensure that first picking robot 740 and second picking robot 740' each pick the topmost foodstuff unit 240$_n$ on portion A and portion B, respectively. In other words, the control entity 1000 can release instructions that assign the first picking robot 740 to pick foodstuff unit 240$_n$ from portion A and that assign the second picking robot 740 to pick another foodstuff unit 240$_n$ from portion B, based on the optimal or predetermined sequence. In some embodiments, the sequence is determined to ensure that the next foodstuff unit 240$_n$ that is to be picked in the sequence is not partially overlapped by any other foodstuff unit 240$_n$ on tray 230. The reader will understand that in embodiments where the presently disclosed systems, methods and non-transitory computer-readable media, implement a predetermined picking sequence, then it would be beneficial to ensure that the foodstuff units on the trays 230 are disposed thereon in the expected configuration, e.g., with the expected partial overlap.

In some embodiments, the perception system includes imaging devices 760 and 760'. Imaging devices 760 and 760' are configured to capture images of a detection area and convey same in the form of detection data to the control entity 1000 and/or picking robot 740.

With reference to the exemplary embodiment shown in FIG. 5, CPU 136 uses the image information obtained from the perception system to determine the absolute positions of foodstuff units $\mathbf{240}_{1\ldots6}$ and the relative positions of foodstuff units $\mathbf{240}_{1\ldots6}$ being conveyed through working area 550. The absolute positions of foodstuff units $\mathbf{240}_{1\ldots6}$ may comprise the positions of foodstuff units $\mathbf{240}_{1\ldots6}$ (or portions thereof) in 2-dimensional (2D) space or 3-dimensional (3D) space. The relative positions of foodstuff units $\mathbf{240}_{1\ldots6}$ may comprise the positions of particular foodstuff units $\mathbf{240}_{1\ldots6}$ (or portions thereof) in 2-dimensional (2D) space or 3-dimensional (3D) space with respect to the positions of other foodstuff units $\mathbf{240}_{1\ldots6}$ (or portions thereof) in 2-dimensional (2D) space or 3-dimensional (3D) space. Such determinations can be performed using any known methods, including, but not limited to, artificial intelligence, computer vision, or suitable combinations thereof. Once the absolute and relative positions of foodstuff units $\mathbf{240}_{1\ldots6}$ are determined, instructions can be generated to cause first picking robot 740 and second picking robot 740' to pick the foodstuff units $\mathbf{240}_{1\ldots6}$ from trays 230 in predetermined sequences, as described elsewhere herein in more detail.

In some embodiments, the absolute and relative positions of foodstuff units $\mathbf{240}_{1\ldots6}$ can be determined in real time. As will be appreciated by the skilled reader, determination of the optimal sequence as well as picking instructions for first picking robot 740 and second picking robot 740' can be determined in real time and can change as individual foodstuff units $\mathbf{240}_{1\ldots6}$ are picked from trays 230. Such real time determination of sequences and picking instructions can be advantageous, for example in situations in which the picking of individual foodstuff units $\mathbf{240}_{1\ldots6}$ causes the absolute and/or relative displacement of one or more other individual foodstuff units $\mathbf{240}_{1\ldots6}$ on a tray.

In some embodiments, the foodstuff units picking and displacing logic, or module, 144 may also or instead be configured to use pre-set picking sequences determined previously for a range of different foodstuff unit combinations. For example, the foodstuff units picking and displacing logic, or module, 144 can maintain a database mapping number of foodstuff units on a tray 230 surface 235 with picking sequence, or the format parameter of foodstuff units to process with picking sequence, and the like. When a production order is received and before computation of the picking sequence is initiated, the foodstuff units picking and displacing logic, or module, 144 searches the database to determine if such production order has not been processed previously and, in the affirmative, extracts the picking sequence previously computed. This approach is faster and more effective than computing a picking sequence every time. However, suppose the database search finds no previous number production order corresponding to the production order. In that case, the foodstuff units picking and displacing logic, or module, 144 will perform a new computation and store it in the database. In this fashion, the database is updated and eventually would capture most, if not all, of the production orders that the automated system 100 can process.

An example of the structure of such a database is shown in FIG. 4. For each number of product units present on a tray 230, there is a picking sequence definition, where the definition provides the position of the product unit in a coordinate system and the order which the product unit must be picked.

Returning to FIG. 7B, at step 1840, the plurality of picking robot 740 receives the instructions including the picking sequence and proceeds to pick and place the plurality of foodstuff units $\mathbf{240}_n$ based on the picking sequence, from a relevant tray 230 to a second conveyor surface 126, preferably one unit at a time, forming a second production stream in serial configuration. For example, when the robot system 700 includes two picking robots 740, 740' the plurality of picking robots 740, 740' may be configured to release the foodstuff units being displaced in a serial configuration, in respective areas on the second conveyor surface 126 to impart sufficient separation distance between each foodstuff units.

The picking robots 740, 740' will repeat steps 850 and 860 until the tray 230 being processed is taken out of working area 550, which is the area of the first conveyor to which the plurality of picking robots 740, 740' have access.

Advantageously, the control entity 1000 can control the cadence of the plurality of picking robots 740 to synchronize the robot system 700. For example, ensuring that the foodstuff units $\mathbf{240}_n$ are picked and placed on the surface of the second conveyor within a time frame that enables emptying the tray 230 before reaching the empty tray module, while displacing the foodstuff units at a reasonable pace and without causing damages that could occur under faster operation pace.

Discard Process

Figure 7C:
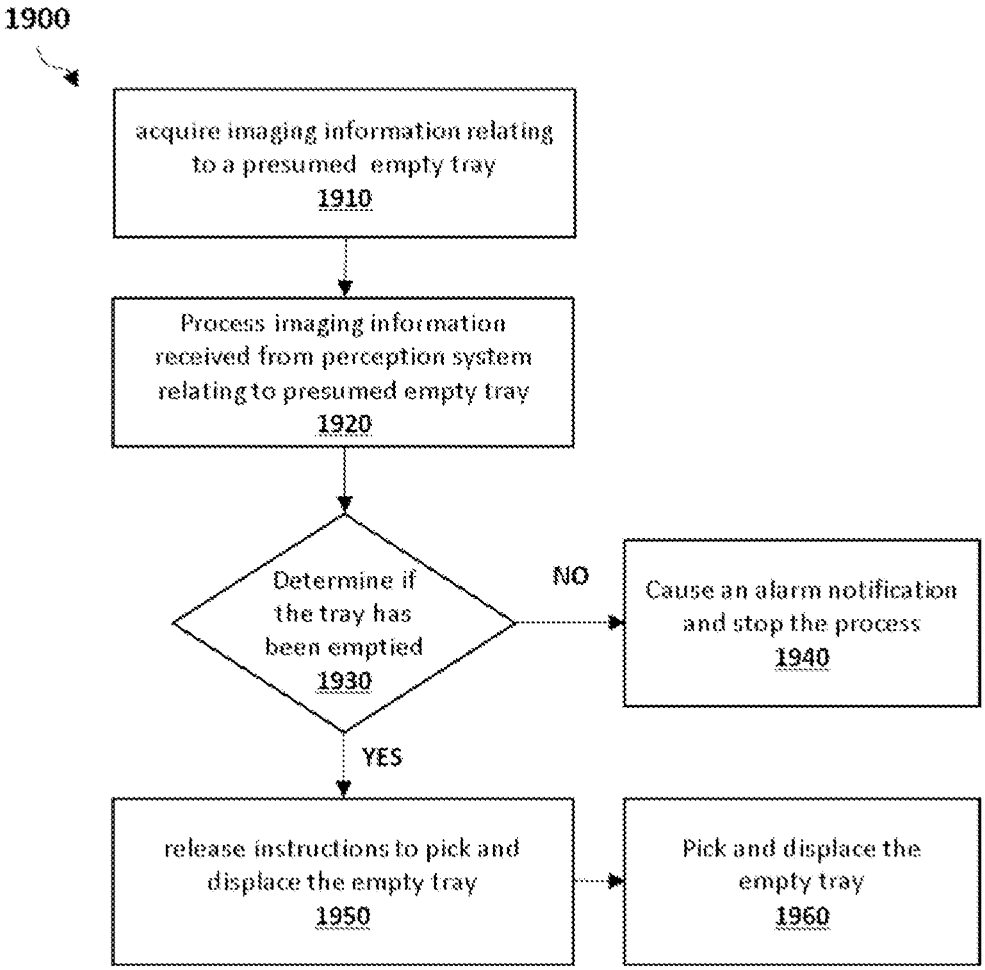

With reference to FIG. 7C, a non-limiting flow chart of an illustrative discarding process 1900 is shown.

In some embodiments, after a relevant tray 230 has been emptied from the plurality of foodstuff units $\mathbf{240}_n$ contained on its surface 235, under normal operation the now empty tray 230 exits the working area 550 and is conveyed downstream on the first conveyor, where the perception system is configured to acquire imaging information relating to the presumed empty tray 230, at step 1910.

In some embodiments, the control entity 1000 implements an empty tray picking and displacing logic block, or module 148.

In some embodiments, the logic of the control entity 1000 can process perception data obtained from the perception system, for example from imaging device 760''' located downstream from the working area 550, to determine whether the tray 230 at the exit of working area 550 has been emptied.

At step 1920, the control entity 1000 processes the perception data relating to the presumed emptied tray 230 to determine if the tray has been emptied. In case that the control entity 1000 determines at step 1930 that the presumed empty tray 230 is not empty from foodstuff units $\mathbf{230}_n$ ("NO" in FIG. 7C), then the control entity 1000 can halt the process and cause an alarm notification to alert an operator, at step 1940. In case that the control entity 1000 determines at step 1930 that the presumed empty tray 230 is indeed empty, then the empty tray picking and displacing logic block, or module 148 releases instructions to the discarding robot 750 to pick and place the empty tray 230 from the first conveyor to the empty tray module 130, at step 1950.

Upon receiving the instructions, the discarding robot 750 is configured to pick and place an empty tray 230 from which all foodstuff units 240$_n$ have been removed, from the first conveyor to the empty tray module 130, at step 1960. For instance, displacing the empty tray 230 to a discarding unit 400 located in the empty tray module 130, as shown in FIG. 5.

Advantageously, the control entity 1000 can control the cadence of the discarding robot 750 to synchronize the robot system 700. For example, ensuring that the discarding robot 750 operates at a cadence that discards the empty tray 230 when it has reached the empty tray module 130, while ensuring to pause the other robots when the discarding robot 750 is unable to pick the empty tray 230 to avoid collision between several empty trays 230, which could otherwise accumulate at the exit of the sorting cell 120.

The control entity 1000 thus controls and synchs the various robots in the robot system 700 as well as the first conveyor to ensure efficiency, precision, sanitation, and/or productivity of the system 100.

Error Event

In some embodiments, during a production shift, the first conveyor can operate on a continuous basis unless the control entity 1000 releases an instruction to the first conveyor to stop operating in presence of detection of an error event, for example.

For example, an error event may include when one of the plurality of picking robots 740 failing to pick a foodstuff unit 240$_n$ from the surface 235 of a relevant tray—halting the first conveyor from operating thus allows the one of the plurality of picking robots 740 to readjust its aim, for example based on detection data conveyed by the perception system, and successfully pick the foodstuff unit 240$_n$. Otherwise, the relevant tray would continue its displacement on the first conveyor downstream from the one of the plurality of picking robots 740 rendering it difficult for the plurality of picking robots 740 to pick all foodstuff units 240$_n$.

When a picking robot 740 is not able to pick a particular foodstuff unit, the one of the plurality of picking robots 740 can be instructed to pick the following foodstuff unit and wait for new detection/vision sensor data (or imaging information, as described above) relating to the missed foodstuff unit, before attempting to pick the missed unit. In case where there is an error event detected, for example one of the plurality of picking robots 740 drops a foodstuff unit, the control entity 1000 can instruct the first conveyor and one or more robots of the robot system 700 to cease their respective activities and/or can issue an alarm signal to alert a human operator.

Practical Non-Limiting Implementation

Figure 9:
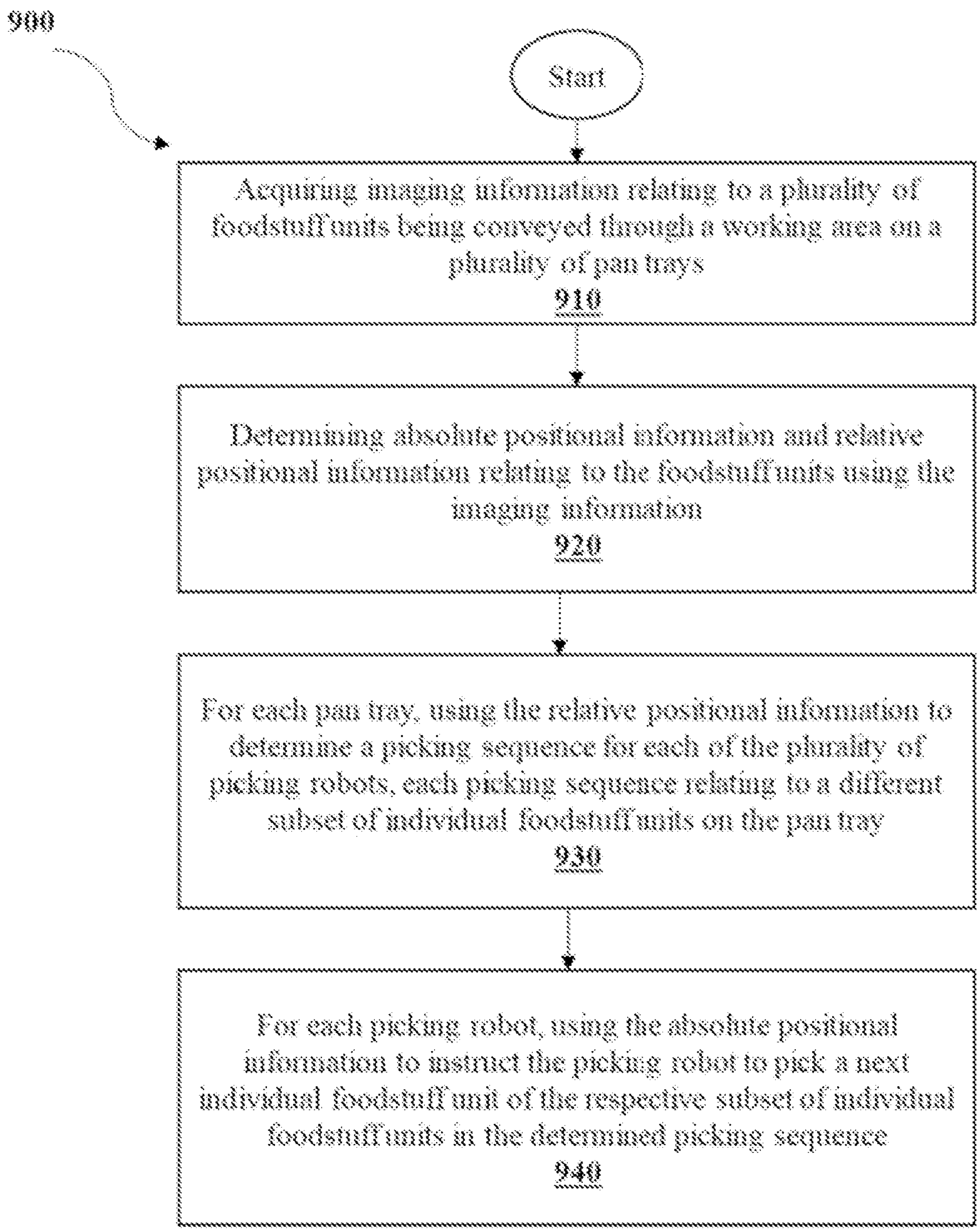
FIG. 9 is a non-limiting flowchart illustrating method steps for processing foodstuff units in accordance with some embodiments of the present disclosure.

With reference to FIG. 9, a non-limiting flow chart of an illustrative sorting process 900 is shown.

At step 910, the method includes acquiring imaging information. For example, imaging information acquired from a detection area with a perception system. For example, the detection area may include at least a portion of a working area containing a plurality of foodstuff units being conveyed through the working area on a first conveyor. At step 920, the method further includes determining absolute positional information and relative positional information relating to the foodstuff units using the imaging information. At step 930, the method further includes, for each tray, using the relative positional information to determine a picking sequence for each of the plurality of picking robots, each picking sequence relating to a different subset of individual foodstuff units on the tray. At step 940, the method further includes, for each picking robot, using the absolute positional information to instruct the plurality of picking robots to pick a next individual foodstuff unit of the respective subset of individual foodstuff units in the determined picking sequence.

For example, the relative positional information can relate to whether individual foodstuff units partially overlap other individual foodstuff units. For example, the absolute positional information can relate to individual foodstuff unit positions in 2-dimensional space, or the absolute positional information can relate to individual foodstuff unit positions in 3-dimensional space. For example, the imaging information can be acquired using a machine vision camera. For example, the absolute positional information and relative positional information can be determined using computer vision and/or artificial intelligence. For example, each of steps 910, 920, 930, 940 can be performed for each picking robot and each tray after each individual foodstuff unit is picked from the tray.

In one non-limiting implementation, the system 100 described herein has been tested with racking systems 200 or 200' containing a plurality of trays 230, where each tray contains a plurality of pies. For example, twelve pies having a diameter of 6" or six pies having a diameter of 9". The pies tested include sugar pies, apple pies, pecan pies, rhubarb and strawberry pies, and strawberry pies. The present inventors have been able to successfully process over 2400 pies having a diameter of 9" per hour and over 2900 pies having a diameter of 6" per hour.

At least some of the herein described steps can be implemented in digital electronic circuitry, in computer hardware, firmware, software, or in combinations of them. The implementation can be as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program, application or engine, or as a module, component, subroutine, or other unit suitable for use in a computing environment. A computer program can be deployed to be executed on one computer or on multiple computers at one site or distributed across multiple sites and interconnected by a communication link. Computer programs are configured to enable online and automated functions such as, for example, sending and receiving messages, receiving query requests, configuring responses, dynamically configuring user interfaces, requesting data, sending control instructions, receiving data, parsing data, displaying data, executing complex processes, interpreting scripts, constructing database queries, executing data base queries, executing simulations, calculations, forecasts, mathematical techniques, workflows and/or algorithms, prompting users, verifying user responses, initiating processes, initiating other computer programs, triggering downstream systems and processes, encrypting and decrypting.

Computer programs and other software elements may be loaded onto a general purpose computer, special purpose computer, or other programmable data processing apparatus to produce a machine, such that the instructions that execute on the computer or other programmable data processing means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified herein or in flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may refer to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. A computer comprises a processor for executing instructions and one or more memory devices for storing instructions and data. Generally, a computer also includes, or can be operatively coupled to receive data from or transfer data to, or both, one or more mass storage devices for storing data, e.g., magnetic, magneto-optical disks, or optical disks. Data transmission and instructions can also occur over a communications link. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computing device coupled to or communicating with a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The components of the system described herein can be interconnected by any form or medium of digital data communication, e.g., a communication link. Examples of communication links include a local area link ("LAN") and a wide area link ("WAN"), e.g., the Internet, and include both wired and wireless links.

The computing system described herein can include clients and servers. A client and server are generally remote from each other and typically interact through a communication link.

The relationship of client and server arises by virtue of computer programs running on the respective computers and having a client-server relationship to each other.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), Flash files or modules, FLEX, ActionScript, extensible markup language (XML), dynamic HTML, cascading style sheets (CSS), helper applications, plug-ins, and/or the like. A web site, server or computer program may include a web service which includes applications that are capable of interacting with other applications over a communications means, such as the Internet.

Other examples of implementations will become apparent to the reader in view of the teachings of the present description and as such, will not be further described here.

All references cited throughout the specification are hereby incorporated by reference in their entirety for all purposes.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

As used herein, the wording "independently selected" in reference to a group of specified items refers to the fact that when more than one item is selected from the group of items, the decision of selecting a specific item is not influenced by the decision of selecting any of the previous or following item(s).

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, when the terms "around", "about" or "approximately" are before a quantitative value, the present disclosure also includes the specific quantitative value itself, unless specifically stated otherwise. As used herein, the terms "around", "about" or "approximately" refer to a ±10% variation from the nominal value unless otherwise indicated or inferred.

Unless otherwise noted, the expression "at least" or "at least one of" as used herein includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Unless otherwise noted, the order of steps or order for performing certain actions is immaterial so long as the present invention remain operable. Moreover, two or more steps or actions may be conducted simultaneously.

Unless otherwise noted, the use of any and all examples, or exemplary language herein, for example, "such as" or "including," is intended merely to illustrate better the present invention and does not pose a limitation on the scope of the invention. No language in the specification should be construed as indicating any non-claimed element as essential to the practice of the present invention.

Although various embodiments of the disclosure have been described and illustrated, it will be apparent to those skilled in the art considering the present description that numerous modifications and variations can be made. The scope of the invention is defined more particularly in the appended claims.

The invention claimed is:

1. An automated system, comprising a) a robot system including a plurality of picking robots configured to sort a plurality of foodstuff discrete units being conveyed through a working area on a plurality of trays, each tray carrying a respective plurality of foodstuff discrete units, b) a perception system, wherein the perception system is configured to acquire imaging information relating to at least the plurality of foodstuff discrete units being conveyed through the working area, and c) a control entity including a data processor, the control entity being in communication with the robot system and the perception system via data communication, wherein the control entity is configured to:

i) receive the imaging information from the perception system and to determine absolute positional information and relative positional information relating to the foodstuff discrete units using the imaging information, ii) for each tray, using the relative positional information, determine a picking sequence for each of the plurality of picking robots, each picking sequence relating to a different subset of individual foodstuff discrete units on the tray, and iii) for each picking robot, using the absolute positional information, instruct the plurality of picking robots to pick a next individual foodstuff unit of the respective subset of individual foodstuff discrete units in the determined picking sequence.

2. The system of claim 1, wherein the relative positional information relates to whether individual foodstuff discrete units partially overlap other individual foodstuff discrete units.

3. The system of claim 1, wherein the absolute positional information relates to individual foodstuff unit positions in 2-dimensional space.

4. The system of claim 3, wherein the absolute positional information relates to individual foodstuff unit positions in 3-dimensional space.

5. The system of claim 1, wherein the imaging information is acquired using a machine vision camera.

6. The system of claim 1, wherein the absolute positional information and relative positional information are determined using computer vision and/or artificial intelligence.

7. An automated system, comprising a) a robot system including a plurality of picking robots configured to sort a plurality of foodstuff discrete units being conveyed through a working area on a first conveyor, the plurality of foodstuff discrete units being on a plurality of trays, b) a perception system, wherein the perception system is configured to acquire imaging information relating to at least the plurality of foodstuff discrete units being conveyed through the working area, and c) a control entity including a data processor, the control entity being in communication with the robot system and the perception system via data communication, wherein the control entity is configured to determine a picking sequence based on perception data relating to the acquired imaging information received from the perception system and to release instructions including the picking sequence to the robot system, wherein in response to the instructions being received at the robot system, the plurality of picking robots is configured to sequentially pick a foodstuff unit from a relevant tray according to the picking sequence, and place the picked foodstuff unit on a second conveyor to form a production stream having a serial configuration.

8. The system of claim 7, wherein the control entity implements a picking sequence logic to compute and determine the picking sequence based on the perception data.

9. The system of claim 8, wherein the perception data contains information to determine a location of the foodstuff unit in the detection area.

10. The system of claim 8, wherein the perception data contains information to determine measurable physical properties of the foodstuff unit being conveyed in the working area.

11. The system of claim 10, wherein the measurable physical properties of the foodstuff unit includes at least one of dimension, edge, and position.

12. The system of claim 7, wherein the perception data contains information to determine availability of a dropping area on the second conveyor for receiving the picked foodstuff unit.

13. The system of claim 7, wherein the robot system further includes a feed robot, wherein in response to instructions received from the control entity, the feed robot is configured to sequentially retrieve the plurality of trays from a racking system, wherein the racking system includes the plurality of trays disposed on corresponding plurality of racks thereof.

14. The system of claim 13, wherein the feed robot is equipped with telescopic arms configured to allow multiple axis movements.

15. The system of claim 7, wherein the plurality of picking robots is disposed along a direction of the first conveyor in an upstream/downstream relationship one to another and in an elevated relationship relative to a top surface of the first conveyor.

16. The system of claim 15, wherein the plurality of picking robots is equipped with a manipulator configured to pick the foodstuff unit, wherein the manipulator is disposed at an end of the robotic arm thereof.

17. The system of claim 7, wherein the robot system further includes a discarding robot configured, in response to instructions received from the control entity, to pick an empty tray from the first conveyor once all foodstuff discrete units have been picked therefrom and displace the empty tray to a discarding unit.

18. The system of claim 7, wherein the control entity includes a machine-readable storage encoded with software for execution by the data processor.

19. A method, comprising:

a) acquiring imaging information relating to a plurality of foodstuff discrete units being conveyed through a working area on a plurality of trays;

b) determining absolute positional information and relative positional information relating to the foodstuff discrete units using the imaging information;

c) for each tray, using the relative positional information to determine a picking sequence for each of a plurality of picking robots, each picking sequence relating to a different subset of individual foodstuff discrete units on the tray; and d) for each picking robot, using the absolute positional information to instruct the plurality of picking robots to pick a next individual foodstuff unit of the respective subset of individual foodstuff discrete units in the determined picking sequence.

20. The method of claim 19, wherein the relative positional information relates to whether individual foodstuff discrete units partially overlap other individual foodstuff discrete units.

21. The method of claim 19, wherein the absolute positional information relates to individual foodstuff unit positions in 2-dimensional space.

22. The method of claim 21, wherein the absolute positional information relates to individual foodstuff unit positions in 3-dimensional space.

23. The method of claim 19, wherein the imaging information is acquired using a machine vision camera.

24. The method of claim 19, wherein the absolute positional information and relative positional information are determined using computer vision and/or artificial intelligence.

25. The method of claim 19, wherein steps a) to d) are performed for each picking robot and each tray after each individual foodstuff unit is picked from the tray.

* * * * *